United States Patent Office 2,866,470
Patented Dec. 30, 1958

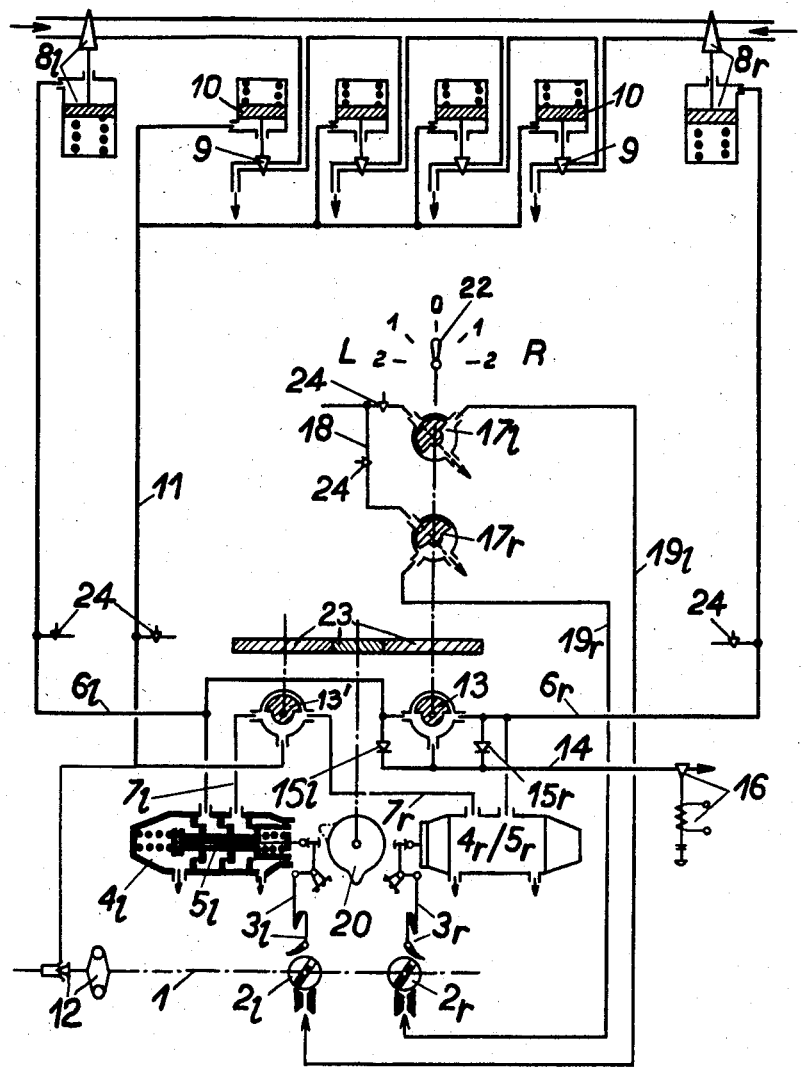

2,866,470

OVERSPEED SAFETY SYSTEM FOR TURBINES

Peter Hold and Arthur Oberle, Wettingen, Switzerland, assignors to Aktiengesellschaft Brown, Boveri & Cie, Baden, Switzerland, a joint stock company Application November 15, 1954, Serial No. 468,891

Claims priority, application Switzerland November 24, 1953

6 Claims. (Cl. 137—24)

This invention relates to an overspeed safety system for turbines driven by a gaseous medium such as steam and more particularly to overspeed safety systems which may be checked as to proper functioning without interrupting the operation of the turbine.

It is customary to provide an overspeed safety system which includes a so-called safety regulator built into the turbine and responsive to centrifugal force when the turbine exceeds a preselected safe speed to operate a mechanical or hydraulic transmission to close a quick-acting gate valve, thereby to interrupt the power input to the turbine. The safety system should be checked from time to time to make certain that it will function properly in the event that the turbine should exceed its maximum safe speed but the prior safety systems and checking methods are open to the objection that the turbine must be taken out of operation for the test.

An object of the present invention is to provide overspeed safety systems which may be checked during the normal operation of the turbine to drive, for example, a generator which remains connected to the load network. An object is to provide an overspeed safety system for a heavy duty turbine fed from two independent steam lines in parallel, the safety system including groups of protective elements associated with each steam line and testing apparatus for substantially isolating the groups from each other for a quick check of either group without, however, preventing the automatic operation of both groups in the event of overspeed operation of the turbine during the checking period. More specifically, an object is to provide an overspeed safety system for turbines fed in parallel by two steam lines which each include a quick-closing gate valve controlled by individual safety regulators of the turbine, the safety system including piping connecting the safety regulators and manually controlled valves for substantially isolating the safety regulators from each other for a check of either safety regulator and the transmission elements between the checked regulator and its associated gate valve.

These and other objects and the advantages of the invention will be apparent from the following specification when taken with the accompanying drawing in which the single view is a schematic diagram of a turbine overspeed safety system embodying the invention.

In the drawing, the reference numeral 1 identifies the shaft of a steam turbine provided with two groups of protective elements which, for convenience of description will be designated "left" and "right" in accordance with their relative positions in the drawing and like parts of the two groups will be identified by the same reference numbers but with subscripts "1" and "r" added to distinguish between parts of the respective groups.

In the drawing, reference numeral 1 identifies the shaft of a steam turbine provided with safety regulators or speed responsive elements $2_1$, $2_r$ of known type which are built into the turbine shaft 1 and work independently of each other to actuate their respective lever systems $3_1$ and $3_r$ to operate release valves or hydraulic transmission elements $4_1$ and $4_r$ having movable pistons $5_1$ and $5_r$ which, when shifted to open position, cause a pressure drop in the pressure oil systems $6_1$, $6_r$ and thereby effect a closure of two quick-closing gate valves $8_1$, $8_r$ in the two steam lines of the turbine. Two further pressure oil lines $7_1$, $7_r$ connect corresponding pressure chambers of the release valves $4_1$, $4_r$ with each other through a valve of the test mechanism as will be described later.

The nozzle valves 9 of the turbine are adjusted by pistons 10 in a pressure oil system 11 under control of a centrifugal speed governor 12 on shaft 1 of the turbine, and are thus regulated in accordance with a varying load as reflected in changes in the turbine speed. Pressure oil lines $6_1$ and $6_r$ are normally connected to each other through a rotary multiposition valve 13 forming part of the test mechanism, and are also connected to a pressure oil line 14 by check valves $15_1$, $15_r$ which open only in such sense as to allow either pressure oil line $6_1$ or $6_r$ to drain into the other through valve 13 or into line 14, and which close to block a flow of pressure oil directly from either line $6_1$ or $6_r$ into the other. As an additional safety feature, pressure oil line 14 may be provided with a manually or automatically operated electromagnetic release valve 16.

The test mechanism includes the rotary valve 13, a similar valve 13' which normally connects lines $7_1$, $7_r$ to each other and to pressure oil line 11, and two additional valves $17_1$, $17_r$ which control the connection of pressure oil line 18 to lines $19_1$, $19_r$, which lead to safety regulators $2_1$, $2_r$ respectively. The test mechanism also includes a cam 20 for resetting release valves $4_1$, $4_r$ after a test has been completed.

The valves and cam of the test mechanism are operable by a handle 22 which is adjustable from an inactive central position 0 to switching positions 1 and 2 to either the left or the right as indicated by the characters L and R respectively.

The pressure oil lines receive oil under pressure from a source, not shown, through calibrated valves or orifices 24, and in normal operation of the turbine, one or both of the safety regulators $2_1$ or $2_r$ actuates its release valve $4_1$ or $4_r$ if the turbine speed exceeds a predetermined critical value. When safety regulator $2_1$ is actuated, for example, it rocks the lever system $3_1$ and this permits piston $5_1$ of release valve $4_1$ to shift to the right, thereby permitting pressure oil to drain from line $6_1$. Pressure line $6_r$ is also drained, since these lines are connected through valve 13 of the testing mechanism, and both quick-acting gate valves $8_1$ and $8_r$ close at the reduction in pressure in their oil cylinders. The several nozzle valves 9 also close simultaneously since pressure oil escapes from lines $7_1$, $7_r$ and 11 when either release valve $4_1$ or $4_r$ opens.

Either of the duplicate groups of safety elements may be checked without taking the turbine out of operation by manipulation of handle 22 of the testing apparatus to isolate the groups from each other and then to actuate the safety regulator $2_1$ or $2_r$ of the selected group. To check the left system, for example, handle 22 is first turned counterclockwise to position 1 to rotate valves 13 and 13' a quarter turn, thereby substantially isolating the two groups of safety elements. Lines $6_1$ and $6_r$ remain connected to line 14 through the check valves $15_1$, $15_r$ respectively but not to each other, since the connecting passage through valve 13 has been closed by the rotation of the shaft to position. Line $7_r$ remains connected to line 11 through valve 13', but line $7_1$ is not connected to $7_r$ since the connecting passage through valve 13' has been closed by the rotation of the shaft to position 1. On turning handle 22 further into position 2, valve $17_1$ closes its normal outlet and simultaneously opens pressure line 18 to line 19₁ which extends to safety regulator 2₁. The increased pressure in line 19₁ activates safety regulator 2₁ to open release valve 4₁ for the escape of pressure oil from line 6₁ and the resulting pressure drop in line 6₁ effects the closing of quick-acting gate valve 8₁ but gate valve 8ᵣ and all nozzle valves 9 remain open since valves 13 and 13′ are now in positions which restrict the connection of lines 6₁, 6ᵣ to the check valve 15₁ and isolate line 7₁ from the pressure line 11.

On returning handle 22 to normal zero position, communication between oil pressure line 18 and line 19₁ is broken and the safety regulator 2₁ is again operative, the cam 20 closes the release valve 4₁ and latches its lever system 3₁ in re-set position, thus conditioning the entire system for normal operation.

In a similar manner, the operation of the other group of the control elements may be checked while the turbine is in operation. It is to be noted that operation of not only a safety regulator but of the entire transmission from it, to and including its associated gate valve, is checked without taking the turbine out of operation. The sequence of steps for checking is positively controlled by the testing mechanism and it is not possible to make any adjustment of handle 22 thereof which would result in an inadvertent interruption of the steam supply to the turbine. Furthermore, at least one safety regulator of the overspeed safety system is operative at all times to shut down the turbine in the event of excessive speed even though the handle 22 is moved to or accidentally left in one of its checking positions. If, for example, the handle 22 is in its first position for a test of the safety elements of the left group when the right safety regulator 2ᵣ is actuated by an excessive turbine speed to open release valve 4ᵣ and drain lines 6ᵣ and 7ᵣ, the line 6₁ is also drained through its check valve 15₁ and valve 13 to close the gate valve 8₁, thereby completing the interruption of the steam supply to the turbine.

The duplicate groups of the safety elements afford greater safety against excessive speed than would a single group, and the invention provides for the checking of either group during operation of the turbine under control of the other group and without completely removing the group under test from the safety system.

We claim:

1. In a turbine plant including a turbine, two steam inlets in parallel for said turbine with gate valves in said inlets, an overspeed safety system comprising duplicate control means for closing the respective gate valves in the event of excessive turbine speed, each control means including a speed responsive element and transmission means actuated thereby to close its associated gate valve, means normally connecting the transmission means of the respective control means for simultaneous operation by either speed responsive element, and testing means adjustable to render said connecting means substantially inoperative when a selected one of said speed responsive elements and its transmission means are to be tested, said testing means including means to actuate one of the speed responsive elements even though excess speed does not exist, whereby the testing of the selected speed responsive element will not activate the transmission means of the other speed responsive element.

2. The invention as recited in claim 1, in combination with nozzle valves controlling the flow of steam from said inlets to said turbine, means including a centrifugal governor driven by said turbine and a pressure oil line for regulating said nozzle valves, and valve means in said pressure oil line for releasing oil therefrom to close said nozzle valves; and wherein means normally couples said valve means to the transmission means of both of said control means for actuation thereby.

3. The invention as recited in claim 2, wherein said testing means renders inoperative the means coupling said valve means to the transmission means of the selected speed responsive element when adjusted for a testing of that speed responsive element and its transmission means.

4. In a turbine plant including a turbine, two motive fluid supplies in parallel with individual gate valves controlling the respective supplies and nozzle valves for regulating the admission of the motive fluid to the turbine; an overspeed safety system comprising two independently operating safety regulators actuated by the turbine, means comprising pressure oil system including pipes connecting said regulators to said gate valves for actuating the same, said pressure oil pipes being divided into two groups each associated respectively with one safety regulator and one gate valve, means including a centrifugal governor driven by the turbine and a further pressure oil system for regulating said nozzle valves, and manually operable testing means normally connecting said further pressure oil system to the pressure oil pipes of both groups; said testing means including valves adjustable to a first position to isolate said groups of pipes from each other and to isolate the regulator to be checked and its pipe group from said further pressure oil system, the testing means being adjustable to a further position to activate the regulator being checked to close its associated gate valve.

5. The invention as recited in claim 4, wherein said gate valves and said nozzle valves close automatically on a reduction in pressure of oil in the pipes associated therewith, in combination with check valves connected between the pipes of the two groups and opening only in the sense which permits pressure oil to drain from pipes of one group into pipes of the other group.

6. The invention as recited in claim 4 including means normally connecting said two groups of pressure oil lines of the respective gate valves for simultaneous operation by either safety regulator.

References Cited in the file of this patent
UNITED STATES PATENTS
2,617,438    Doran _____ Nov. 11, 1952